United States Patent Office 3,567,428
Patented Mar. 2, 1971

3,567,428
PROCESS FOR COLD HARDENING OF PELLETS
Karl Jonas Valter Svensson, Strassa, Sweden, assignor to Trafikaktiebolaget Grangesberg-Oxelosund, Stockholm, Sweden
No Drawing. Filed Jan. 21, 1969, Ser. No. 792,777
Claims priority, application Sweden, Jan. 16, 1968, 1,052/68
The portion of the term of the patent subsequent to Jan. 20, 1987, has been disclaimed
Int. Cl. C21b 1/24
U.S. Cl. 75—3     4 Claims

ABSTRACT OF THE DISCLOSURE

The invention relates to a process for the cold hardening of pellets comprising finely divided metal oxide, finely divided hydraulic binding agent, water and coke breeze or petroleum coke. Green pellets are produced and then embedded in a mass of the finely divided metal oxide in such a way that, in principle they are isolated from each other. The mass of the finely divided metal oxide is separated when the pellets, thanks to the setting effect of the hydraulic binding agent have achieved an acceptable strength.

---

This invention is a development of the invention according to my U.S. application Ser. No. 678,648. The original patent application relates to a process for cold hardening of pellets containing finely divided metal oxide, finely divided hydraulic binding agent and water, these ingredients being intimately mixed with one another and green pellets being produced of the obtained mixture. The characteristic feature of the invention according to the original patent application is that the pellets are embedded in a moist mass in such a way that in principle, they are isolated from one another and are subjected, while under the influence of the mass, to a substantially uniform pressure on all sides which does not deform the pellets. The mass is separated when the pellets, thanks to the setting effect of the hydraulic binding agent have achieved the strength required for the continued treatment. When producing pellets it is suitable to mix intimately 75–95 parts, by weight, metal oxide with 5–25 parts, by weight, hydraulic binding agent as per dry substance; the mixture should contain 7–10 percent water. According to a preferred embodiment the hydraulic binding agent is a rapidly setting agent which preferably comprises cement clinkers finely ground prior to the mixing with the metal oxide without addition of sulphurous substances, such as gypsum. Preferably the embedding mass comprises iron ore concentrates with a moisture of 7–10 percent. According to this preferred embodiment the metal oxide in the pellets consists of iron oxide.

These pellets have been formed to possess a high reductability which means a low consumption of carbon during the blast furnace reduction and a low iron content in the slag.

The present improvement of the invention according to the original patent application relates to a further improvement of the reductability, with a subsequent lower consumption of carbon during reduction.

The present invention is characterized in that the mixture from which the green pellets are produced, in addition to finely divided metal oxide, finely divided hydraulic binding agent and water, also contains coke breeze or petroleum coke. In this respect the present invention differs from an earlier patent according to which carbon is intermixed as a reduction agent in cement-bound pellets. As a matter of fact, trials have shown that carbon or anthracite, completely destroys the setting effect of the cement probably depending upon the high content of humus contained in these substances. Coke, on the contrary has an insignificant effect or no effect at all on the setting capacity, since the humus substances are destroyed at the high temperature which the coke is subjected to when it is produced. The upper limit for the quantity of added coke breeze or petroleum coke is determined by the amount of the required reduction carbon. Coke breeze or petroleum coke exceeding this amount is not regarded as contributing to lower the total carbon consumption in the course of the reduction. The lower limit is not critical since pellets produced according to the original application, i.e., without addition of coke breeze or petroleum coke possess a high reductability, but the quantity to be intermixed comprises about half the amount of the required reduction carbon.

According to a preferred embodiment coke breeze or petroleum coke is added in a quantity up to one third of the metal oxide, by weight, contained in the mixture and preferably about one sixth of the metal oxide, by weight.

The most important advantage of intermixing coke breeze or petroleum coke in the pellets is that the price of these products is considerably lower than that of normal blast furnace coke, since owing to their fine grain size coke breeze or petroleum coke cannot be used as a separate reduction agent in the blasting furnace.

Before being added to the mixture the coke breeze or petroleum coke should be ground to a grain size which in the main corresponds to that of the metal oxide contained in the mixture.

What I claim is:

1. A process for cold hardening of green pellets containing finely divided metal oxide material, finely divided hydraulic binding agent and a carbon material selected from the group of coke breeze and petroleum coke in which the metal oxide material is intimately mixed with the binding agent, carbon material and water and green pellets are produced of the obtained mixture, the improvement comprising embedding the green pellets in a mass of discrete particles of the finely divided metal oxide material already present in the pellets so that the pellets are isolated from each other and while under the influence of the embedding mass are subjected to a substantially uniform pressure on all sides which does not deform the pellets and separating the mass of finely divided metal oxide material from the resulting hardened pellets when the pellets have achieved an acceptable strength by the setting of the hydraulic binding agent.

2. A process as claimed in claim 1 wherein the amount of carbon material contained in the pellets is not more than about one third by weight of the amount of metal oxide in the pellets.

3. A process as claimed in claim 2 wherein the amount of carbon material is about one sixth by weight of the amount of metal oxide.

4. A process as claimed in claim 1 wherein the grain size of the carbon material is substantially the same as the grain size of the finely divided metal oxide in the pellets.

References Cited
UNITED STATES PATENTS

| | | | |
|---|---|---|---|
| 3,370,936 | 2/1968 | Johnson et al. | 75—3 |
| 3,490,895 | 1/1970 | Svensson | 75—3 |

ALLEN B. CURTIS, Primary Examiner